United States Patent
Fan et al.

(10) Patent No.: US 8,072,950 B2
(45) Date of Patent: Dec. 6, 2011

(54) COLLABORATIVE MOBILE AD HOC NETWORK INFRASTRUCTURE

(75) Inventors: Guoxin Fan, Plano, TX (US); Nim K. Leung, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1075 days.

(21) Appl. No.: 11/610,008

(22) Filed: Dec. 13, 2006

(65) Prior Publication Data

US 2008/0039125 A1 Feb. 14, 2008

Related U.S. Application Data

(60) Provisional application No. 60/806,582, filed on Jul. 5, 2006.

(51) Int. Cl.
| | |
|---|---|
| *H04W 4/00* | (2009.01) |
| *A63F 9/24* | (2006.01) |
| *A63F 13/00* | (2006.01) |
| *A63F 9/02* | (2006.01) |
| *A63B 67/00* | (2006.01) |
| *G06F 17/00* | (2006.01) |
| *G06F 19/00* | (2011.01) |
| *G06F 15/177* | (2006.01) |
| *G06F 15/173* | (2006.01) |
| *G06F 15/16* | (2006.01) |
| *H04H 20/71* | (2008.01) |
| *H04B 7/00* | (2006.01) |

(52) U.S. Cl. ............... 370/338; 463/42; 463/49; 463/50; 463/51; 463/52; 463/53; 463/54; 709/221; 709/223; 709/224; 709/225; 709/227; 455/3.05; 455/463; 455/500

(58) Field of Classification Search .................. 370/338; 463/42, 49–54; 709/221, 223–225, 227; 455/3.05, 463, 500
See application file for complete search history.

(56) References Cited

U.S. PATENT DOCUMENTS

| | | | |
|---|---|---|---|
| 5,618,045 A | 4/1997 | Kagan et al. | |
| 6,659,861 B1 * | 12/2003 | Faris et al. | 463/1 |
| 2003/0079003 A1 * | 4/2003 | Burr | 709/221 |
| 2004/0063498 A1 | 4/2004 | Oakes et al. | |
| 2004/0082383 A1 | 4/2004 | Muncaster et al. | |
| 2006/0268933 A1 * | 11/2006 | Kellerer et al. | 370/469 |

FOREIGN PATENT DOCUMENTS

| | | |
|---|---|---|
| CN | 1568011 A | 1/2005 |
| CN | 1605179 A | 4/2005 |
| WO | WO 03/034664 A1 | 4/2003 |

OTHER PUBLICATIONS

Webopedia Computer Dictionary, CSMA/CD Feb. 2005, Webopedia, 1 page.*
Wikipedia, World of Warcraft Nov. 2004, Wikipedia, 24 pages.*
Wikipedia, GunBound Jun. 2005, Wikipedia, 11 pages.*
Wikipedia, StarCraft Mar. 1998, Wikipedia, 22 pages.*
European Search Report dated Sep. 11, 2009 in connection with European Patent Application No. 07 11 1624.
Office Action dated Dec. 18, 2009 in connection with Chines Patent Application No. 2007101274140.

\* cited by examiner

*Primary Examiner* — Nick Corsaro
*Assistant Examiner* — Munsoon Choo

(57) ABSTRACT

A system for providing collaboration among a plurality of devices in a mobile ad hoc network is disclosed. The system consists of a module within each of the devices that is operable to perform login, synchronization, data loss recovery, and conflict avoidance and resolution functions.

21 Claims, 3 Drawing Sheets

US 8,072,950 B2

COLLABORATIVE MOBILE AD HOC NETWORK INFRASTRUCTURE

CROSS-REFERENCE TO RELATED APPLICATIONS

This application claims priority to U.S. Provisional Patent Application No. 60/806,582, entitled "Collaborative Mobile Ad Hoc Network Infrastructure", filed on Jul. 5, 2006, by Guoxin Fan, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to mobile ad hoc computer networks, and more particularly, but not by way of limitation, to a system and method for providing collaboration among devices in such networks.

BACKGROUND OF THE INVENTION

Traditional local area networks (LANs) typically have a central server that acts as a controller and coordinator for data traffic among the clients in the network. Communication between clients in a traditional LAN typically does not occur directly from one client to another. Instead, data might be sent from a client to the server and then from the server to another client. The server might also handle the logging in of clients, the synchronization of the activities of the clients, and other centralized control functions.

As an example, if multiple players are playing a game on a traditional LAN, control of game-related functions might be coordinated by one or more servers. Players might join a game by logging in to a login server. Activities in the game might then be controlled by a central server. The central server might maintain a set of tables that keep track of current and future players, scores, histories, and other game status details. The central server might also coordinate communication between the players. That is, instead of the players communicating directly with one another or directing actions directly toward one another, messages or actions might be directed from a first player to the central server and from the central server to a second player.

SUMMARY OF THE INVENTION

In one embodiment, a system for providing collaboration among a plurality of devices in a mobile ad hoc network is provided. The system consists of a module within each of the devices that is operable to perform login, synchronization, data loss recovery, and conflict avoidance and resolution functions.

In another embodiment, a method for providing collaboration among a plurality of devices in a mobile ad hoc network is provided. The method consists of a module within each of the plurality of devices performing login, synchronization, data loss recovery, and conflict avoidance and resolution functions.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
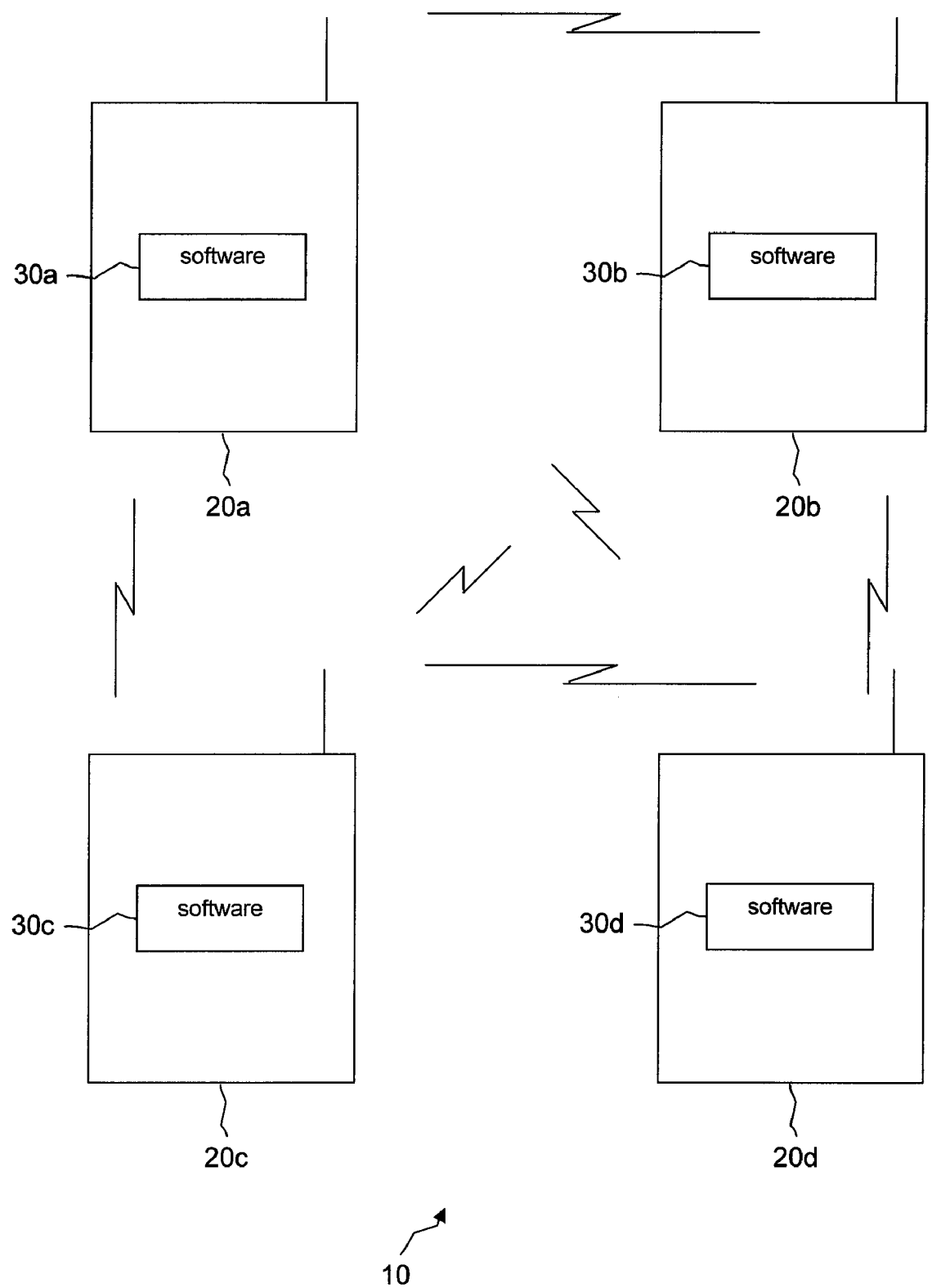
FIG. 1 is a diagram of a mobile ad hoc network according to an embodiment of the disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

A mobile ad hoc network (MANET) can be defined as a group of wireless computing devices capable of communicating directly with one another without a server acting as a central coordinator or scheduler for the data traffic between the devices. A MANET typically comprises a plurality of wireless devices such as laptop computers, handheld computers, mobile phones or mobile handsets, personal digital assistants, and similar devices. The devices might be capable of communicating with one another via a well-known wireless data transfer protocol, such as Transmission Control Protocol/Internet Protocol (TCP/IP).

Since there is no server in a MANET, there is no central controller to manage functions such as logging in, synchronization, recovery from data loss, and conflict avoidance and resolution. There is no decision-making entity to determine an action to take when unexpected events occur. For example, if multiple players were to attempt to play a multiplayer game on a MANET, there would be no login server as there would be for a multiplayer game played on a traditional network. Therefore, in a MANET, it may not be possible to verify the identity of the players attempting to play a game or to keep track of who is currently playing and who is waiting to play. If two players joining a game attempt to take the same position in a login table, one or both might be unable to join.

Also, there is no global clock in a MANET to ensure that the actions of the players in a multiplayer game are synchronized. Each device in a MANET may have an internal clock, but the different clocks may run at slightly different speeds. Even if the clocks of all the devices in a MANET were synchronized at the beginning of a game, the clocks could lose their synchronization as the game progressed.

Further, a MANET has no coordinator to deal with the loss of data packets exchanged by the devices in the MANET. In a traditional network, if a data packet transmitted by a device does not reach its destination, the central server can take appropriate measures to recover from the data loss. The server might instruct the transmitting device to resend the packet, for instance. There is no central entity in a MANET that can determine when data loss occurs and what steps should be taken to recover from the data loss.

In addition, there is no central coordinator in a MANET to manage conflict avoidance and resolution. In the case of a multiplayer game, several types of conflicts might arise. For example, in a game in which the players are represented by icons that can move about on a display screen, two icons might attempt to occupy the same space on the screen. Such an overlapping of the icons might cause undesirable results in the action of the game. In a traditional network, the central server might prevent such conflicts from occurring or might resolve such conflicts after they occur. A MANET has no server to deal with such conflicts.

Another type of conflict might occur in, for example, a shooting game in which multiple players attempt to shoot at objects on a screen. In such a game, two players might shoot the same object at about the same time. In a traditional network, the central server might determine which player gets credit for shooting the object. In a MANET, there is no central entity that could make such a decision.

FIG. 1 illustrates an embodiment of a portion of a MANET 10 containing devices 20, such as the wireless devices described above, that are capable of overcoming these shortcomings of previous MANETs. Each device 20 contains a module 30 that can perform one or more functions among login, synchronization, data loss recovery, and conflict avoidance and resolution functions. The modules 30 might be software, firmware, logic circuitry, or similar modules. Users of the devices 20 that contain the modules 30 might be able to play multiplayer games and perform other coordinated activities that traditionally required a central server.

In an embodiment, the devices 20 communicate by forming a multicast group with one another. In IPv6, a multicast group is formed by using a header to specify that the associated data packet is a multicast packet. In IPv4, a range of addresses are dedicated to multicast transmissions. That is, each device 20 uses an IP address in the range from 224.xxx.xxx.xxx to 239.xxx.xxx.xxx. Devices 20 that use IP addresses in this range and that are near enough to each other to reliably send and receive information to and from each other wirelessly can be considered to be logged in to or a part of the MANET 10.

If a first user of a first device 20a wishes to join a multiplayer game, the first user sends a multicast transmission to all of the other devices 20 in the MANET 10 informing the other devices 20 of the first user's identity and the first user's desire to enter the game. The modules 30 in the other devices 20 maintain or have access to tables that keep track of all users currently in the game and wishing to enter the game. Upon receiving the first user's request to join the game, the modules 30 in the other devices 20 might add the first user to their tables of game players. The other devices 20 would then send the first device 20a information about their respective users and the first device 20a would add the information about the other users to a table maintained by the module 30a in the first device 20a. In this way, each device 20 can maintain a table of information about the other players and, collectively, the tables in all of the devices 20 in the MANET 10 can maintain information that is equivalent to the information contained in a centralized server in a traditional network.

A player attempting to log in to a multiplayer game might request a position in a player table that is already occupied by another player. To avoid such a conflict, the modules 30 might follow a protocol for assigning players to different positions in the player tables. In an embodiment, the protocol might involve the first device 20a randomly choosing a number of a position in the player tables and sending a message to the other devices 20 informing the other devices 20 of its intention to use the selected position.

The other devices 20 then determine whether the position corresponding to the selected number is in use in their tables. If the position is not in use, each of the other devices 20 sends the first device 20a a message stating that the position is available. If the first device 20a does not receive a message from any of the other devices 20 stating that the position is in use, the first device 20a uses the table position, updates its player table to reflect that it is using the table position, and sends a message to the other devices 20 stating that that table position is in use. The other devices 20 then update their player tables appropriately.

If, upon informing the other devices 20 of its intention to use a selected table position, the first device 20a receives a notification from one of the other devices 20 that the selected table position is in use, the first device 20a randomly selects another table position and again follows the procedure described above. This process continues until the first device 20a selects an unused table position.

If the first device 20a and a second device 20b both send messages stating their intentions to use the same table position, a protocol might be followed to determine whether the first device 20a or the second device 20b is assigned to the selected table position. In an embodiment, this protocol calls for the first device 20a and the second device 20b to randomly select wait times and then delay for the period of their random wait times. If, after delaying its wait time, the device 20a or the device 20b has not received a renouncement message, the device 20a or the device 20b sends a renouncement message and ceases its attempt to use the selected table position. The device 20a or the device 20b that received the renouncement message then uses the selected table position.

For example, if the device 20a selected a shorter wait time than the device 20b, the device 20a would delay its wait time, recognize that it has not received a renouncement message, renounce its attempt to use the table position that it had selected, and send a message stating that it has renounced. The device 20b, after delaying its wait time, would recognize the renouncement message from the device 20a, recognize that the table position that it had selected is available, use the selected table position, and send a message to the other devices 20 that it has taken the selected table position.

In many network-based games, creation of a new game entails the creation of a new table. In an embodiment, similar considerations to those discussed above for the selection of a position in a table could apply to creation of a new table. That is, a player wishing to start a new game might broadcast a number of a table for the game. If the other devices 20 in the MANET 10 do not respond that that table number is in use, the player could use the table number. If two players request to use the same table number, a renouncement procedure similar to that described above could be used to determine which player is allowed to use the table number.

When the devices 20 are engaged in a multiplayer game or some other cooperative activity, the devices 20 typically need to coordinate the sequences of occurrence for events that affect multiple devices 20. Each of the devices 20 typically contains an internal clock to coordinate its internal activities, but the internal clocks in each device 20 are not necessarily synchronized with one another. For example, each device 20 might have the same time at the beginning of a game, but if some of the clocks are faster than others the clocks might lose their synchronization. This could lead to events occurring in an improper sequence. Since there is no central server in the MANET 10, there is no global clock within the MANET 10 to synchronize the events carried out by the devices 20.

Various techniques could be used to provide synchronization to the MANET 10. In one embodiment, each device 20 is equipped with a global positioning system (GPS) receiver. The GPS receiver in each device 20 could receive a timing signal from a GPS satellite and use this signal as a global clock for synchronizing the activities of the devices 20. In an alternative embodiment, each device 20 periodically broadcasts the time indicated by its internal clock. The other devices 20 receive these broadcasts and make the appropriate adjustments to take any differences in timing into account. Alternatively, the devices 20 might adjust to one another by calculating and applying an adjustment function based on the differences in speed between the devices 20. The devices 20 might take the round trip delay time of the broadcasts into account when adjusting to the times of the other devices 20.

Data packets transmitted within the MANET 10 could become lost in several different manners. For example, if the device 20*a* is outside the transmission range of the other devices 20 in the MANET 10, the device 20*a* might not receive a data packet. Also, one or more data packets that are transmitted simultaneously by different devices 20 might interfere with one another, causing one or more of the packets to fail to reach their destinations. Other causes of data loss will be familiar to one of skill in the art.

In a traditional network, a central server can take steps to compensate for data loss. In the MANET 10, where there is no central server, data loss might be managed in different manners depending on the circumstances of the data loss. In one example, a multiplayer game might involve the movement of one or more icons across the display screens of the devices 20. A series of data packets might describe the path that an icon is to take across the screens. If one of these packets is lost, the devices 20 might not be able to determine the path that the icon should take.

In an embodiment, a procedure similar to the navigation technique known as dead reckoning might be used to estimate the path that such an icon would have taken if the data loss had not occurred. That is, an estimate of the icon's future path could be made by noting its previous path and speed and assuming that the icon will continue on the same path at the same rate. The icon can then be made to take this estimated path. The software modules 30 in the devices 20 might be capable of making such an estimate in a consistent manner so that each device 20 estimates the same path for the icon and causes the icon to take the same path on the screen of each device 20.

Various types of conflicts might occur in the MANET 10 when the devices 20 are used for multiplayer games or other cooperative activities. In one example, two icons in a multiplayer game might try to occupy the same space in the display screen of a device 20 at the same time. Such an overlapping of icons might lead to ambiguity in the action of the game and might need to be avoided.

In an embodiment, the modules 30 in the devices 20 can resolve such a conflict by changing one or both of the routes that were taken by the icons to arrive at the shared position. That is, the modules 30 can keep track of the paths that the icons took to reach the shared position. At least one of the modules 30 can then select a point on at least one of the previous paths and cause the icon that had taken that previous path to take a different path starting at the selected point. Alternatively, at least one of the modules 30 might select a first point on at least one of the previous paths, randomly choose a second point near the first point but not on the previous path, and cause the icon to start at the second point and take a path substantially parallel to the previous path. In either case, at least one icon will follow a new path that does not lead to the shared position.

The recognition that an overlap has occurred, the calculation of a new path for at least one of the overlapping icons, and the movement along the new path can occur quickly enough that the players will not notice any delay or flickering in the movement of the icon that takes the previous path and then takes the new path. Also, the new path can be similar enough to the previous path that the player manipulating the icon that takes the new path will not notice that the icon did not take the path that the player intended.

Another type of conflict might occur, for example, in a shooting game in which multiple players attempt to shoot at targets that appear on the screens of the devices 20 used by the players. If two players happen to hit the same target at the same time, a conflict would arise regarding which player should get credit for hitting the target. In an embodiment, when such a conflict occurs, the software modules 30 in the devices 20 used by each of the two players, for example software module 30*a* and software module 30*b*, can recognize that the two players have shot the same target at the same time. Software module 30*a* and software module 30*b* might then each select a random number and software module 30*a* might send its random number to software module 30*b* and software module 30*b* might send its random number to software module 30*a*. The software modules 30*a* and 30*b* might then input the random numbers into an algorithm that determines which player is given credit for hitting the target. For example, credit might be given to the player for whom the lower random number was chosen.

When conflicts occur, the software modules 30 may require some time to resolve the conflicts. Loss of synchronization could occur in the MANET 10 if some software modules 30 take actions while other software modules 30 are resolving conflicts. For example, if software module 30*a* needed to resolve a conflict but, at the same time, software module 30*b* did not need to resolve a conflict, software module 30*b* might take an action before the conflict being addressed by software module 30*a* was resolved. If the actions taken by software module 30*b* and/or the outcomes of those actions have any dependence on the resolution of the conflict being addressed by software module 30*a*, undesirable results could occur.

In an embodiment, such undesirable outcomes can be prevented by causing each software module 30 to wait a short delay time before taking any action. For example, each software module 30 might take actions only at regularly spaced intervals. The delay time between each interval can allow other software modules 30 to complete the resolution of any conflicts that they are addressing.

Figure 2:
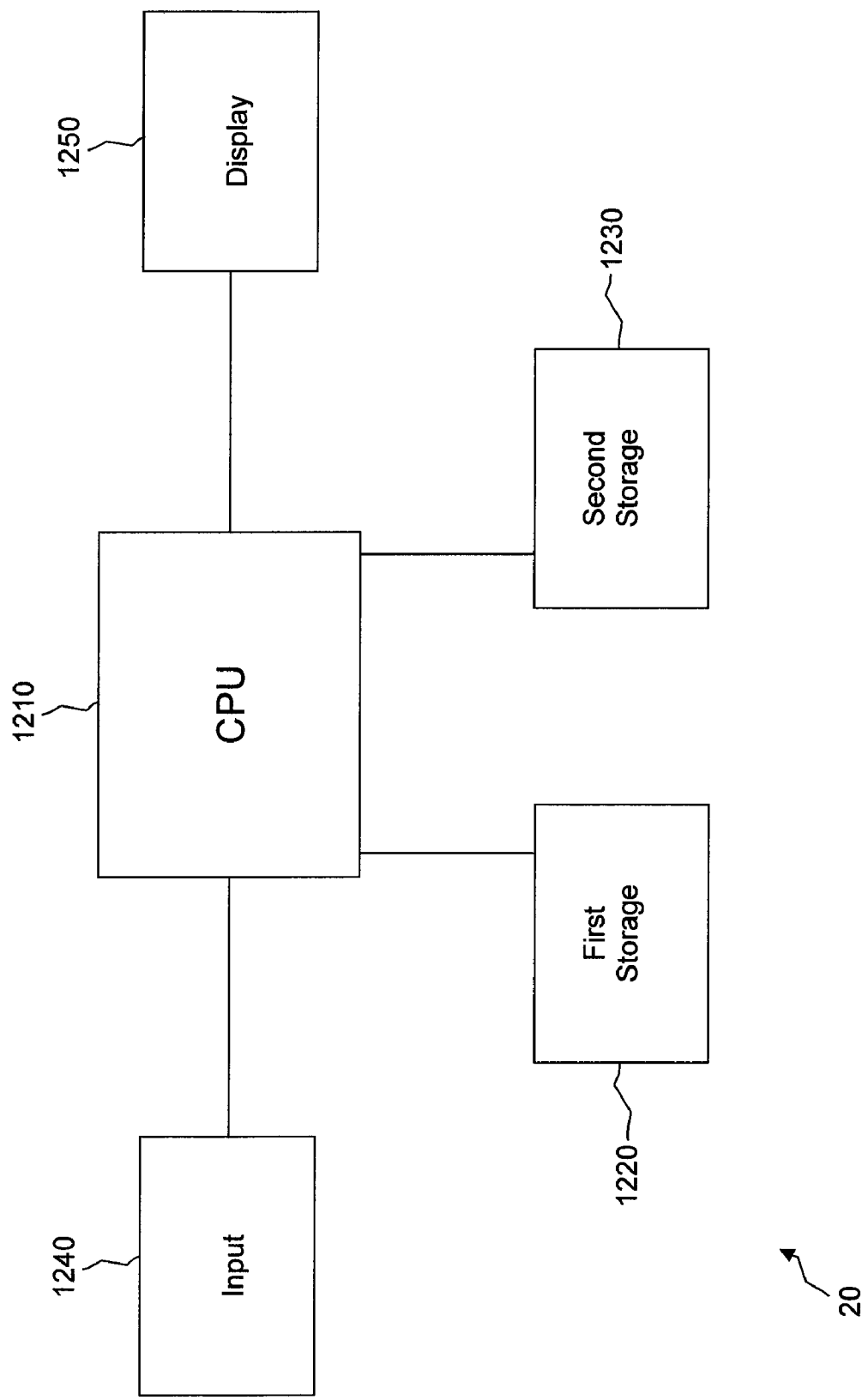
FIG. 2 illustrates a block diagram of a mobile device operable for some of the various embodiments of the present disclosure.

All or portions of the system described above may be implemented on any hand-held mobile electronic device 20 such as is well known to those skilled in the art. An exemplary device 20 for implementing one or more embodiments disclosed herein is illustrated in FIG. 2. The device 20 includes a processor 1210 (which may be referred to as a central processor unit or CPU) that is coupled to a first storage area 1220, a second storage area 1230, an input device 1240 such as a keypad, and an output device such as a display screen 1250. As is well known to those skilled in the art, the device 20 may comprise a transmit/receive antenna (not shown) and radio frequency transmit/receive circuitry (not shown), some of which may be implemented by the processor 1210. In an embodiment, some of the transmit/receive antenna and radio frequency transmit/receive circuitry may be combined with some of the processor 1210 as a system-on-a-chip (SOC).

The processor 1210 may be implemented as one or more CPU chips and may execute instructions, codes, computer programs, or scripts that it accesses from the first storage area 1220 or the second storage area 1230. The processor 1210 may be implemented using one or more digital signal processors (DSPs), programmable logic devices (PLDs), field programmable gate arrays (FPGAs), application specific integrated circuits (ASICs), and/or other specialized semiconductor logic device. The first storage area 1220 might be a non-volatile memory such as flash memory. Device 20 data would typically be installed in the first storage area 1220. The second storage area 1230 might be firmware or a similar type of memory. The device's operating system would typically be installed in the second storage area 1230.

Figure 3:
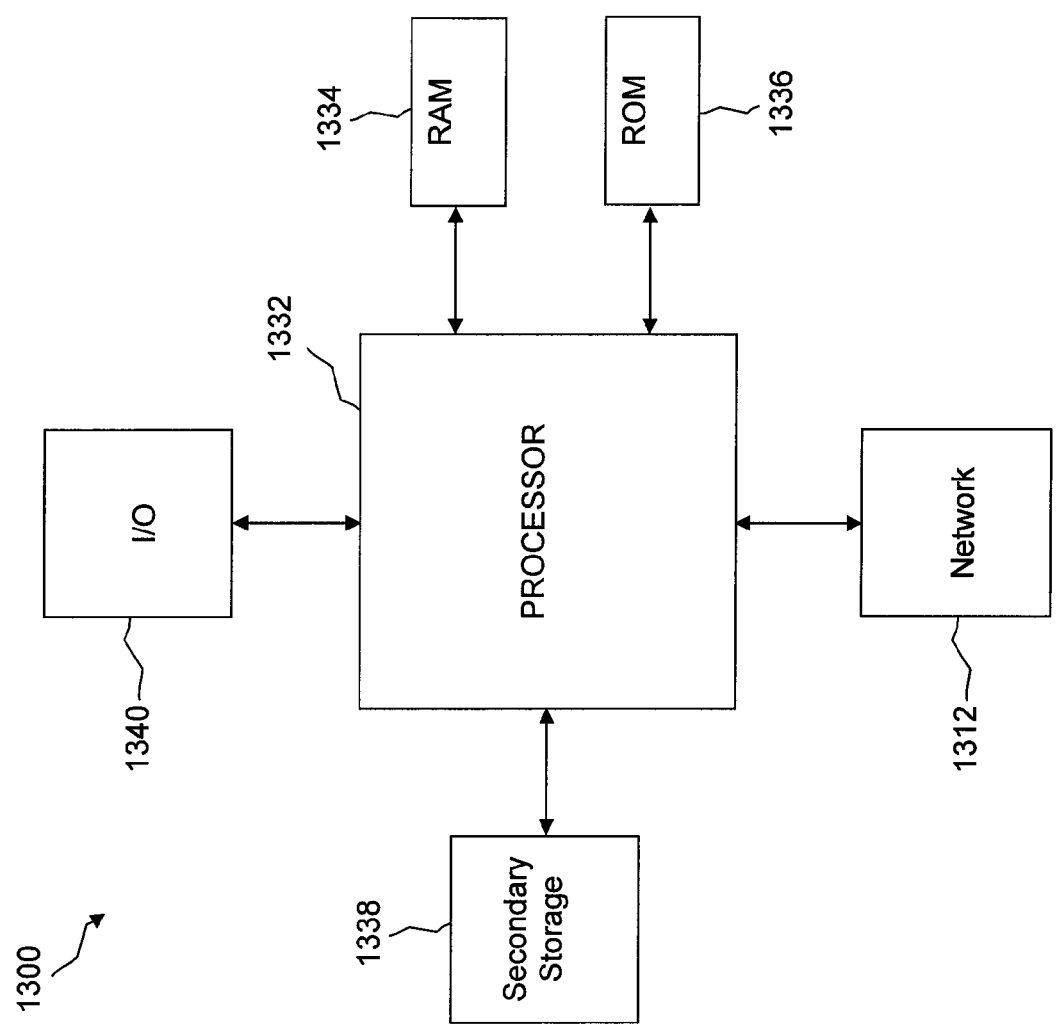
FIG. 3 illustrates an exemplary general-purpose computer system suitable for implementing the several embodiments of the present disclosure.

The devices described above may be implemented on any general-purpose computer with wireless communications capabilities and with sufficient processing power, memory resources, and network throughput capability to handle the necessary workload placed upon it. FIG. 3 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for providing collaboration among a plurality of devices in a mobile ad hoc network, the system comprising:
a first device of the plurality of devices, the first device comprising:
a processor configured to:
receive a signal generated outside the first device and synchronize an activity of the first device with the other plurality of devices using the signal,
estimate lost data packets transmitted from a second device of the plurality of devices using data packets previously received from the second device, and
resolve conflicts that arise when the first device and the second device take a same action with regard to the activity,
wherein a plurality of actions taken by the plurality of devices are synchronized by each of the plurality of devices sending each of the others of the plurality of devices a plurality of times indicated by an internal clock within each of the plurality of devices and each of the others of the plurality of devices making an appropriate adjustment to compensate for a difference between at least two of the internal clocks.

2. The system of claim 1, wherein the mobile ad hoc network is formed by the plurality of devices forming a multicast group.

3. The system of claim 2, wherein the plurality of devices forming the multicast group includes transmitting data to IP addresses in the range from 224.000.000.000 to 239.255.255.255 in the IP Version 4 address space and wherein the plurality of devices are in near enough proximity to one another that the plurality of devices can send and receive information to and from one another wirelessly.

4. The system of claim 1, wherein, when a first user of the first device wishes to participate in the activity with a second user of the second device, the first device sends information about the first user to the second device and the second device decides, based on the information about the first user, whether to allow the first user to participate in the activity.

5. The system of claim 4, wherein, when the second device decides to allow the first user to participate in the activity, the second device informs the first device of the allowance, the second device stores the information about the first user in a table maintained by the second device, the second device sends information about the second user to the first device, and the first device stores the information about the second user in a table maintained by the first device.

6. The system of claim 5, wherein the activity is a multi player game and wherein the first user requests to participate in the game with the second user by requesting access to a position in the table maintained by the second device.

7. The system of claim 6, wherein the second device determines whether the position requested by the first user has been given to another user, and, when the position requested by the first user has been given to another user, the first user requests another position in the table maintained by the second device, and, when the position requested by the first user has not been given to another user, the second device grants the position requested by the first user to the first user and the first device and the second device record that the position requested by the first user has been granted to the first user.

8. The system of claim 6, wherein, when the first device and a third device substantially simultaneously request access to the position in the table maintained by the second device, the first device and the third device select random wait times, wait the random wait times, and, when the shorter wait time expires, the device with the shorter wait time renounces its request for access to the position in the table maintained by the second device, and, when the longer wait time expires, the device with the longer wait time is granted access to the position in the table maintained by the second device.

9. The system of claim 1, wherein a plurality of actions taken by the plurality of devices are synchronized by a global positioning system.

10. The system of claim 1, wherein the plurality of devices participate in an activity in which at least one icon moves on a display screen on each of the plurality of devices and wherein an actual position of the at least one icon cannot be definitively ascertained due to a loss of information transmitted between the plurality of devices and wherein an estimated position of the at least one icon is determined from a previous path and speed of the at least one icon.

11. The system of claim 1, wherein the plurality of devices participate in the activity in which a plurality of icons move on a display screen on each of the plurality of devices and wherein, when at least two of the icons attempt to occupy a single position on the display screen, at least one of the at least two icons is placed on a path that is different from a path that led to the single position.

12. The system of claim 11, wherein the path that is different from the path that led to the single position is a path that begins at a previous point on the path that led to the single position and continues from the previous point in a direction different from the direction of the path that led to the single position.

13. The system of claim 1, wherein a plurality of users of the plurality of devices participate in the activity in which at least some of the plurality of users shoot toward at least one target on a display screen on each of the plurality of devices and wherein, when at least two users shoot a single target substantially simultaneously, the devices used by the at least two users each execute an algorithm to determine which of the at least two users is given credit for shooting the target.

14. The system of claim 1, wherein the plurality of devices wait a delay time before performing an action to allow at least one of the plurality of devices sufficient time to resolve a conflict.

15. A method for providing collaboration among a plurality of devices in a mobile ad hoc network, the method comprising:
receiving, by a first device of the plurality of devices, a signal generated outside the first device and synchronizing an activity of the first device with the other plurality of devices using the signal;
estimating, by the first device, lost data packets transmitted from a second device of the plurality of devices using data packets previously received from the second device, and
resolving, by the first device, conflicts that arise when the first device and the second device take a same action with regard to the activity,
wherein a plurality of actions taken by the plurality of devices are synchronized by each of the plurality of devices sending each of the others of the plurality of devices a plurality of times indicated by an internal clock within each of the plurality of devices and each of the others of the plurality of devices making an appropriate adjustment to compensate for a difference between at least two of the internal clocks.

16. The method of claim 15, further comprising forming the mobile ad hoc network by the plurality of devices forming a multicast group.

17. The method of claim 16, further comprising the plurality of devices that form the multicast group transmitting data to IP addresses in the range from 224.000.000.000 to 239.255.255.255, wherein the plurality of devices are in near enough proximity to one another that the plurality of devices can send and receive information to and from one another wirelessly.

18. The method of claim 17, further comprising, when a first user of the first device wishes to participate in the activity with a second user of the second device, the first device sending information about the first user to the second device and the second device deciding, based on the information about the first user, whether to allow the first user to participate in the activity.

19. The method of claim 18, further comprising, when the second device decides to allow the first user to participate in the activity, the second device informing the first device of the allowance, the second device storing the information about the first user in a table maintained by the second device, the second device sending information about the second user to the first device, and the first device storing the information about the second user in a table maintained by the first device.

20. The method of claim 19, wherein the activity is a multiplayer game and further comprising the first user requesting to participate in the game with the second user by requesting access to a position in the table maintained by the second device.

21. The method of claim 20, further comprising the second device determining whether the position requested by the first user has been given to another user, and, when the position requested by the first user has been given to another user, the first user requesting another position in the table maintained by the second device, and, when the position requested by the first user has not been given to another user, the second device granting the position requested by the first user to the first user and the first device and the second device recording that the position requested by the first user has been granted to the first user.

* * * * *